March 15, 1955 D. A. BANKS 2,704,224
COMBINATION ARM PROTECTOR AND SUN AND RAIN
SHIELD FOR AUTOMOBILES, TRAINS, ETC.
Filed May 25, 1954
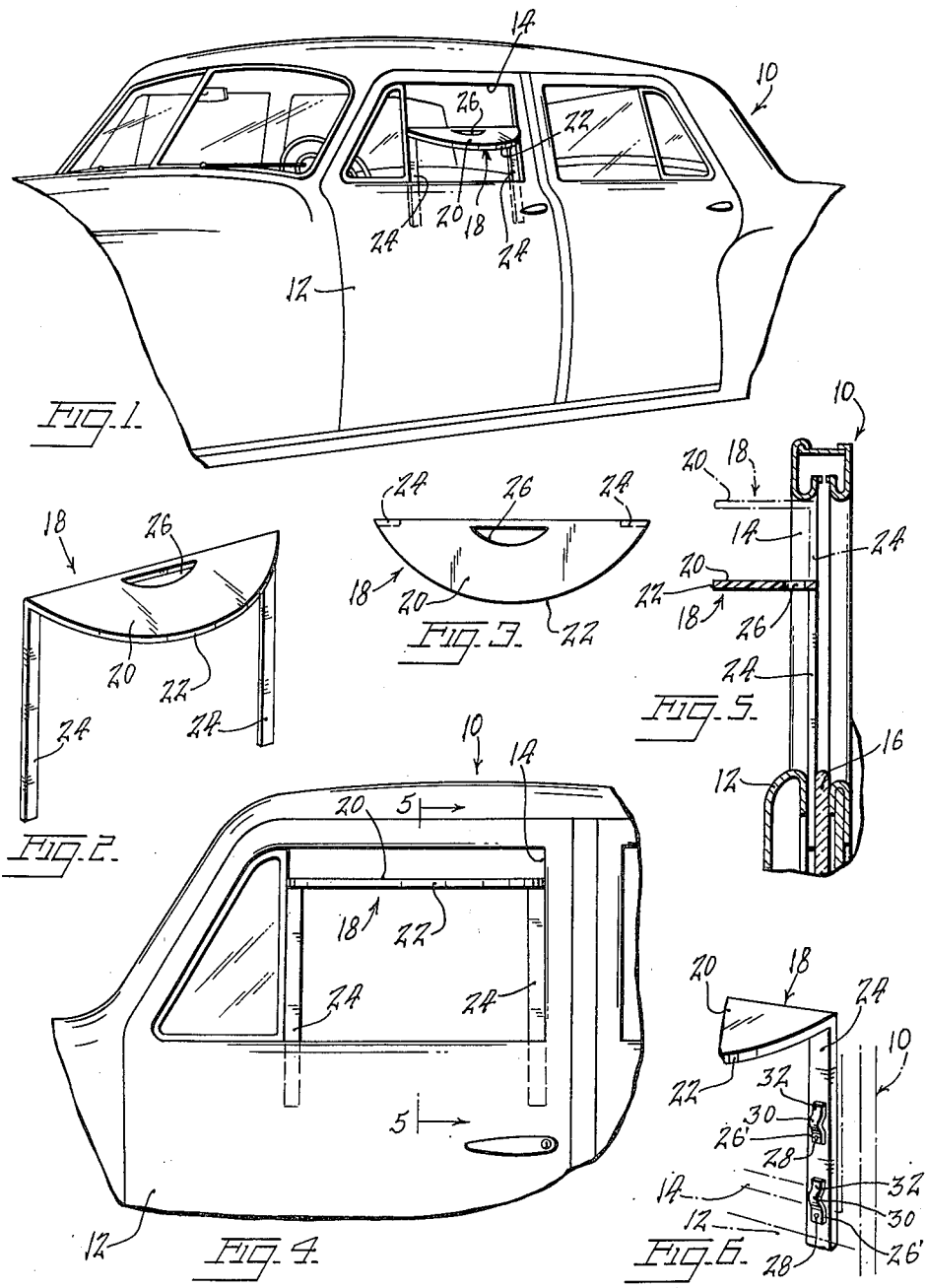
INVENTOR.
DOROTHY ANNA BANKS
BY
ATTORNEY

2,704,224

COMBINATION ARM PROTECTOR AND SUN AND RAIN SHIELD FOR AUTOMOBILES, TRAINS, ETC.

Dorothy Anna Banks, Eden, Md.

Application May 25, 1954, Serial No. 432,237

4 Claims. (Cl. 296—49.2)

This invention relates to a device insertible in the frame of an automobile window, and adapted when so inserted to be shifted to any of various selected positions of adjustment, for use as an arm rest, or as a shield against sun and rain, whichever is desired.

It is well appreciated among automobile drivers and passengers that on a hot, sunny day, the lower edge of the frame of an automobile window often becomes so heated as to cause serious discomfort, and in many instances actual burns, when contacted by one's hand or arm. Many drivers, in this connection, prefer to operate a vehicle while resting an arm upon this portion of the window frame, and obviously, this is impossible under the circumstances referred to.

In view of the above, it is one important object of the invention to provide a device so formed as to be insertible in the well of the window frame, in a manner that will permit the device to be disposed as a ledge on which one can comfortably rest his or her arm, without danger of being burned.

Another object is to provide a device as stated that will not require modification or redesign of the vehicle window frame or window operating mechanism in any way.

Another object of importance is to so design the combination device as to permit the window to be raised or lowered without difficulty, without interfering with or being interfered with by the invention.

A further important object is to form the combination device constituting the invention in such a way as to permit its swift up-and-down adjustment to selected positions, in one of which it will serve as an arm rest with or without a hand hold opening, and in the others as an adjustably located rain or sun shield for small children as well as for adults.

Yet another object is to provide, in the device, a conveniently located hand hold, which will not only facilitate adjustment of the device, but which will also be adapted to be grasped readily by those drivers who prefer to grip some portion of the window frame when driving.

Still another object is to so shape the device as to particularly adapt the same for preventing rain from entering an open automobile window.

A further object is to provide, in one form of the device, yielding means that will aid in holding the article in a selected position of adjustment.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary perspective view of an automobile equipped with a combination device formed in accordance with the invention.

Fig. 2 is a perspective view of the device per se.

Fig. 3 is a top plan view of the device.

Fig. 4 is a fragmentary side view of a vehicle door and window frame showing the device mounted therein.

Fig. 5 is an enlarged sectional view on line 5—5 of Fig. 4, the full and chain-dotted positions showing the device adjusted for use as a sun or rain shield, and the dash-dotted position showing it positioned for use as an arm rest.

Fig. 6 is a fragmentary perspective view of the device showing a modification for holding the same in selected positions of adjustment, a vehicle window being shown fragmentarily and in dotted lines.

The reference numeral 10 has been applied generally to a vehicle having a door 12 in which is incorporated a window frame 14 provided with the usual peripheral channel and well for mounting therein a window 16.

The invention has been generally designated 18, and in Figs. 1-5, is integrally formed from a single piece of material, preferably hard rubber or plastic of a type having a low thermal conductivity characteristic. The device is formed with a ledge 20 of a length to extend between the opposite sides of the window, said ledge being flat over its full area and being formed with a straight inner edge and with an arcuately bowed outer edge 22. At the tapered ends of the ledge, there are integrally formed depending, straight, elongated legs 24 of flat cross section, and in use of the device, the legs are inserted in the window well between the window pane 16, and the outer garnish mold or vehicle body as the case may be. The thickness of the legs is such as to cause the legs to bind frictionally against the window pane and the outer edge of the window well, in each position to which the legs are adjusted vertically within the well.

Preferably, there is formed in the ledge, adjacent the straight inner edge thereof, an opening 26 of a shape corresponding to the outer configuration of the ledge, said opening defining a hand hold which facilitates grasping of the device when the same is to be adjusted vertically. Further, the hand hold allows one to grasp the device while driving, should he or she have the not unusual habit of holding on to some part of the window assembly while operating the vehicle.

In use of the device, and assuming that it is to be used as an arm rest, the legs are inserted to their maximum extent, the ledge resting on the edge of the window well as shown in the lower dotted line position of Fig. 5. One can now rest his or her arm wholly on the ledge, during operation of the vehicle. Of course, should the rubber or plastic itself be hot to the touch, the device can be manufactured with a thickness of cloth or padding overlying the upper face of the ledge. This variation is considered sufficiently obvious to those skilled in the art as not to require special illustration herein.

If the device is to be used as a sun or rain shield, it is pulled upwardly to a selected extent, as for example, to the full line position shown in Fig. 5, or to the chain-dotted position in the same figure. In any of these positions, of course, one can raise or lower the window as desired, without interfering with or being interfered with by the adjustably located device 18.

The shape of the ledge is of importance, and as will be noted, the ledge is widest at its midlength location, where one's arm would normally be supported. Further, the arcuate outer edge has been selected to provide the greatest shield area where the maximum concentration of rain or sun is likely to be found, when the article is raised.

In Fig. 6, there is shown a modification adapted to aid in holding the device in a selected, raised position of adjustment. Secured to each leg 24, and spaced apart longitudinally of the leg, are leaf spring detents 26'. Each detent is formed as a short length of flat spring material, one end of which is flat and has an aperture through which extends a screw 28 threaded into the leg. Rivets could of course also be used, as could any other type of anchoring element found suitable.

Intermediate its ends, the detent is formed with a crimp 30, merging into a flat free end 32 tensioned to lie flat against the adjacent face of the leg.

The crimp is so shaped as to be normally bowed outwardly as shown in Fig. 6, and as a result, when the legs are pulled upwardly, the crimp of the lowermost detent exposed on upward movement of the legs will rest against the edge of the window well, to prevent the legs from shifting downwardly into the well.

The detents are so shaped, however, as to yield during the actual movement of the device upwardly or downwardly during the making of an adjustment in the position thereof. In other words, assuming the device is to be adjusted downwardly from the Fig. 6 position, the crimp of each detent, as it moves downwardly, will flatten out to pass the upper edge of the window well. When the detent has moved fully into the well, it will resume its normal position.

When the device is to be adjusted upwardly once again, the crimp of each detent, when it comes into engagement with said upper edge of the well, will flatten out once again to pass the upper edge in an upward direction. Once out of the well, the crimp of each detent will resume its normal position, with the lowermost, exposed detent functioning as a projection that will engage the lower edge of the window frame to hold the device against downward movement.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A combination arm rest and sun and rain shield for an automobile window frame of the type having a window well, comprising a ledge on which an arm may be supported and which is adapted to provide a shield against the elements, and means depending from the ledge engageable in the well, said means including depending, elongated legs secured to the ledge, said legs being of a thickness to bind the same frictionally against adjacent portions of the window assembly of the vehicle.

2. A combination arm rest and sun and rain shield for an automobile window frame of the type having a window well, comprising a ledge on which an arm may be supported and which is adapted to provide a shield against the elements, and means depending from the ledge engageable in the well, said means including depending, elongated legs secured to the ledge, said legs including resiliently yieldable detents spaced longitudinally thereof, said detents being adapted to yield for passage into and out of the well, and being adapted to rest against the upper edge of the well on vertical adjustment of the legs outwardly of the well, to hold the legs against downward movement.

3. A combination arm rest and sun and rain shield for an automobile window frame of the type having a window well, comprising a ledge on which an arm may be supported and which is adapted to provide a shield against the elements, and means depending from the ledge engageable in the well, said means including depending, elongated legs secured to the ledge, said legs including resiliently yieldable detents spaced longitudinally thereof, said detents being adapted to yield for passage into and out of the well, and being adapted to rest against the upper edge of the well on vertical adjustment of the legs outwardly of the well, to hold the legs against downward movement, said detents being formed of leaf spring material.

4. A combination arm rest and sun and rain shield for an automobile window frame of the type having a window well, comprising a ledge on which an arm may be supported and which is adapted to provide a shield against the elements, and means depending from the ledge engageable in the well, said means including depending, elongated legs secured to the ledge, said legs including resiliently yieldable detents spaced longitudinally thereof, said detents being adapted to yield for passage into and out of the well, and being adapted to rest against the upper edge of the well on vertical adjustment of the legs outwardly of the well, to hold the legs against downward movement, said detents being formed of leaf spring material, with each detent having one end anchored to the leg associated therewith and its other positioned flat against said leg, each detent having a crimp intermediate its ends adapted to be flattened when the detent is passing the upper edge of the well.

References Cited in the file of this patent

UNITED STATES PATENTS

| | | |
|---|---|---|
| 1,873,190 | Doller | Aug. 23, 1932 |
| 1,965,955 | De Foe et al. | July 10, 1934 |
| 2,050,951 | Hundertmark | Aug. 11, 1936 |
| 2,586,631 | Esch | Feb. 19, 1952 |